(12) United States Patent
Henley

(10) Patent No.: US 10,046,423 B2
(45) Date of Patent: Aug. 14, 2018

(54) ADJUSTABLE PIPE ALIGNMENT TOOL

(71) Applicant: Nathan E Henley, Bon Wier, TX (US)

(72) Inventor: Nathan E Henley, Bon Wier, TX (US)

( * ) Notice: Subject to any disclaimer, the term of this patent is extended or adjusted under 35 U.S.C. 154(b) by 133 days.

(21) Appl. No.: 15/294,362

(22) Filed: Oct. 14, 2016

(65) Prior Publication Data

US 2017/0106481 A1   Apr. 20, 2017

Related U.S. Application Data

(60) Provisional application No. 62/241,605, filed on Oct. 14, 2015.

(51) Int. Cl.
*B25B 1/04* (2006.01)
*B23K 37/053* (2006.01)
*B23K 101/06* (2006.01)

(52) U.S. Cl.
CPC ...... *B23K 37/0533* (2013.01); *B23K 2201/06* (2013.01)

(58) Field of Classification Search
USPC ............... 269/130, 131; 29/243.55, 244, 261
See application file for complete search history.

(56) References Cited

U.S. PATENT DOCUMENTS

| | | | | |
|---|---|---|---|---|
| 1,410,553 A | * | 3/1922 | Cox | B25B 1/14 269/130 |
| 5,494,268 A | * | 2/1996 | Heintz | B25B 13/52 269/130 |
| 8,590,876 B1 | * | 11/2013 | Madson | B25B 5/147 254/134 |
| 2002/0130456 A1 | * | 9/2002 | Hebert | B25B 5/006 269/17 |

* cited by examiner

*Primary Examiner* — Joseph J Hail
*Assistant Examiner* — Shantese McDonald

(57) ABSTRACT

An alignment tool that is used to hold a pipe fitting stationary in the welding process includes a pipe guide, a guide shaft, and an adapter. The adapter can vary according to the fitting that is to be welded. As an example, the adapter can be a flange adapter, a 90-degree adapter or a 45-degree adapter. The guide shaft is slidably engaged to a connecting arm which is perpendicularly and terminally fixed to the pipe guide. Therefore, the distance between the guide shaft and the pipe guide can be varied as preferred. A base section of the adapter is slidably engaged along the guide shaft. Therefore, the position of the fitting which is mounted on the adapter can also be repositioned as preferred. In order to hold the pipe against the pipe guide, a chain is being used.

13 Claims, 18 Drawing Sheets

ADJUSTABLE PIPE ALIGNMENT TOOL

The current application claims a priority to the U.S. Provisional Patent application Ser. No. 62/241,605 filed on Oct. 14, 2015.

FIELD OF THE INVENTION

The present invention relates generally to alignment tools. More specifically, the present invention is an adjustable pipe alignment tool. Using the present invention, individuals will be able to fit various pipe elbows and flanges onto straight pipes with ease. The adjustable aspect of the present invention provides a new and innovative way of aligning pipe ends in preparation for welding.

BACKGROUND OF THE INVENTION

Pipe welding is one of the most cost-efficient methods of joining multiple sections of pipe. This process of welding involves heating pieces of metal and joining them so that the resulting assembly can be used as one single unit. The welding needs to be completed with great accuracy since improper joints can lead to unfavorable circumstances.

Improper welding can be caused due to multiple reasons. The fitting not being properly aligned with the pipe is one of the main reasons for an improper joint. As witnessed by many individuals in the field of the present invention, most misalignments occur due to the absence of an appropriate fitting holder. Therefore, the need for a method that can keep the pipe fitting stationary during the welding process is clearly evident.

Another disadvantage in existing welding methods is the need to manually hold the fitting during the process of welding. Since a considerable amount of heat is generated during the welding process, there is a probability to cause injury to the hands of the user. Therefore, the need for a method of welding that can be used to prevent injuries is clearly evident.

The objective of the present invention is to address the aforementioned issues. The present invention is an adjustable pipe alignment tool that allows users to conveniently align pipe ends in preparation for welding. Similar pipe alignment tools exist today, however are fairly difficult to use, do not allow for convenient adjustments and often interfere with the ability to weld the pipe ends together. The present invention aims to improve upon the existing inventions, providing a device that is much more convenient to use. The adjustable aspect is most unique to the present invention and allows users to adjust the pipes in all directions for a perfect alignment. The adjustment mechanism of the present invention will not interfere with the ability to weld once the alignment has been made. Once properly aligned, the adjustable pipe alignment tool will hold the pipe ends together for welding. In this regard, the user does not have to physically hold the pipe ends together, thus eliminating any chances of burning oneself during the welding process. The present invention can be used for pipes of varying sizes as well as pipe flanges and pipe elbows with varying angles. The present invention will comprise multiple adapters that facilitate the alignment of pipe elbows of varying angles, whether it be a 45-degree pipe or a 90-degree pipe. Therefore, the present invention provides an easy to use, adjustable pipe alignment tool which improves upon similar existing inventions.

DETAIL DESCRIPTIONS OF THE INVENTION

All illustrations of the drawings are for the purpose of describing selected versions of the present invention and are not intended to limit the scope of the present invention.

The present invention introduces an apparatus that can be used to hold and align a fitting during a pipe welding process. The effective design of the present invention eliminates the need to manually hold the pipe and fitting during the welding process and therefore eliminates any potential misalignment errors. By utilizing the present invention, fittings of different shapes and sizes can be welded with minimum error.

Figure 1:
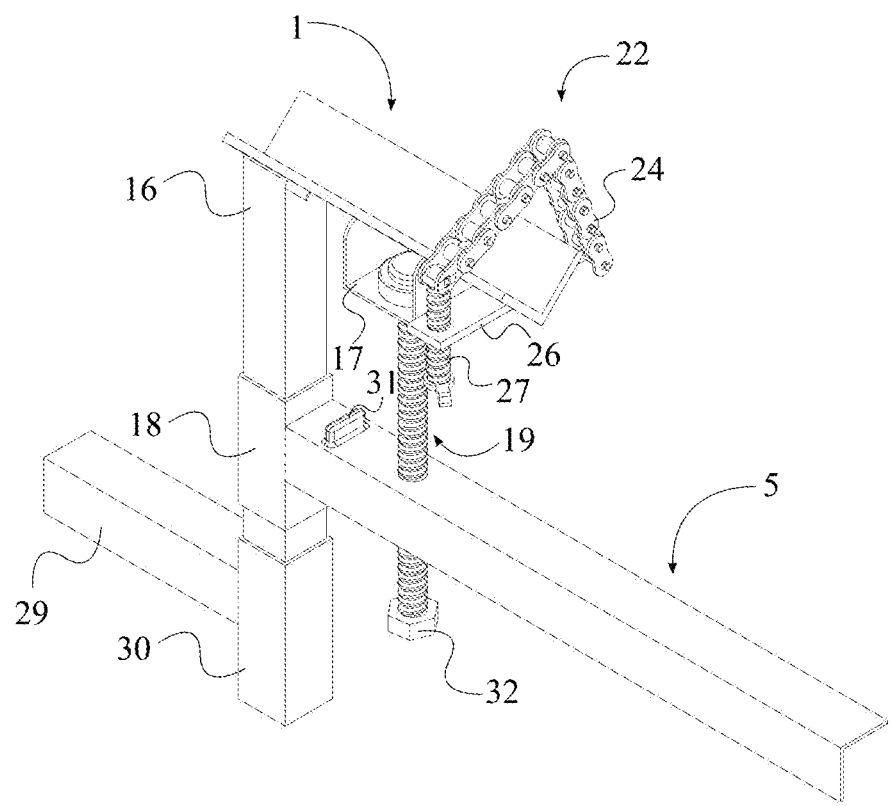
FIG. 1 is a perspective view of an assembly of the pipe guide and the guide shaft.
Figure 2:
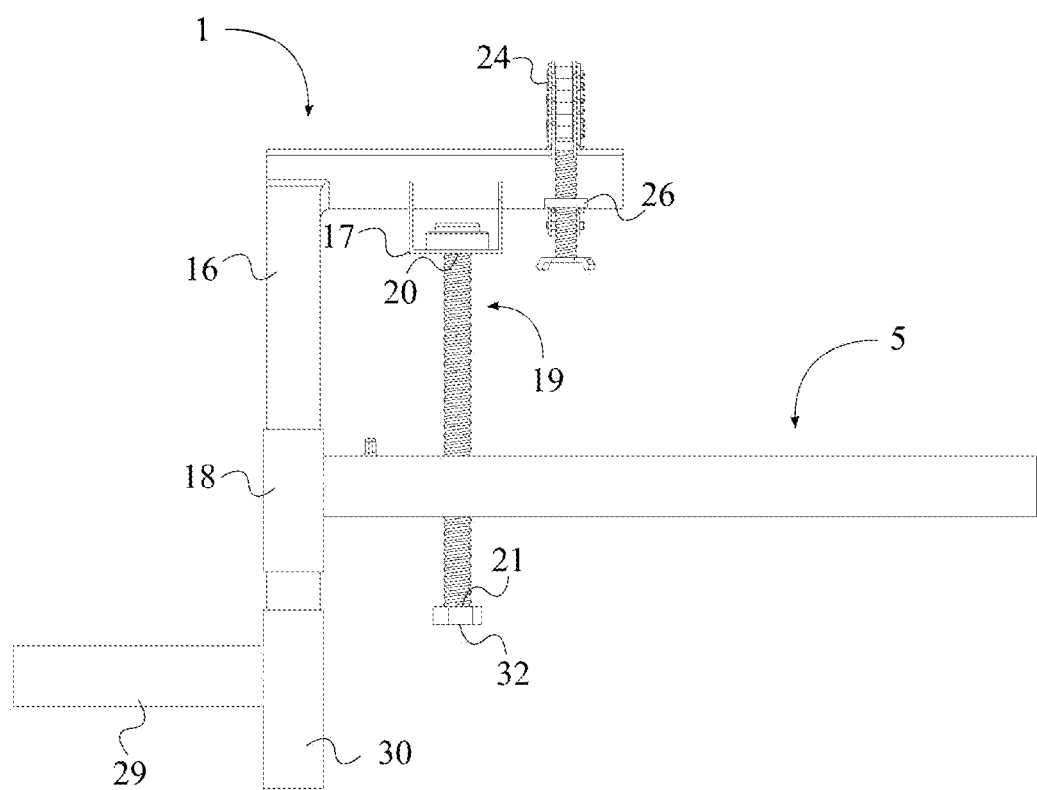
FIG. 2 is a side view of the assembly of the pipe guide and the guide shaft.
Figure 3:
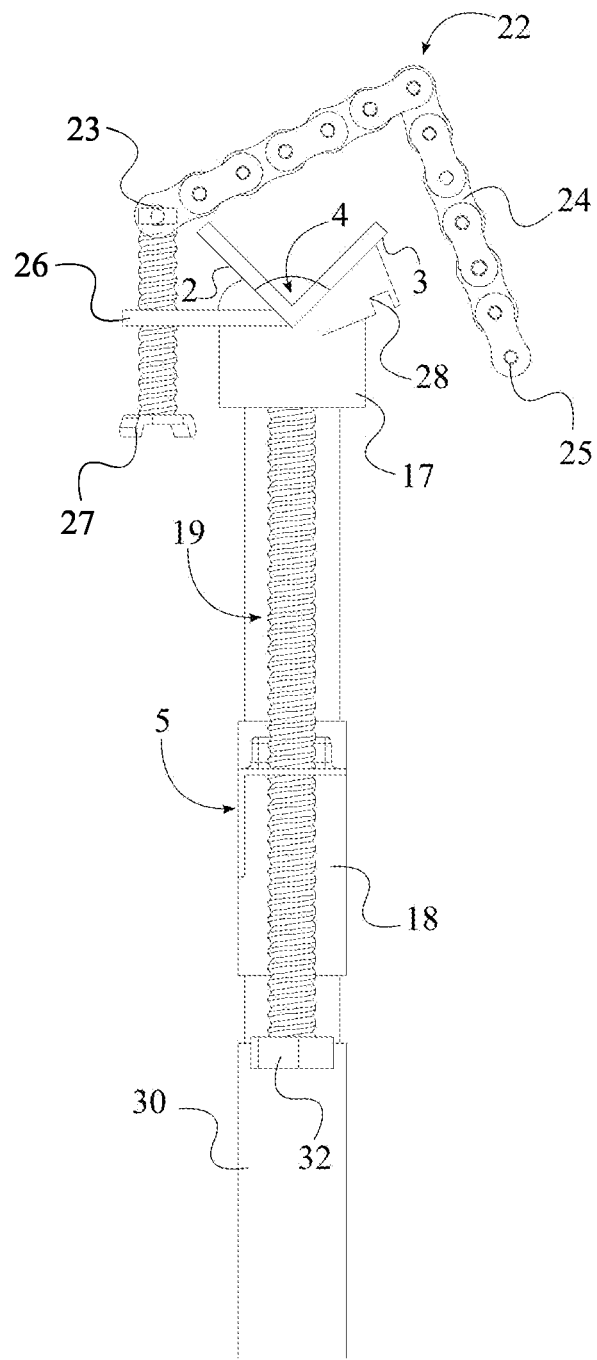
FIG. 3 is another side view of the assembly of the pipe guide and the guide shaft.
Figure 4:
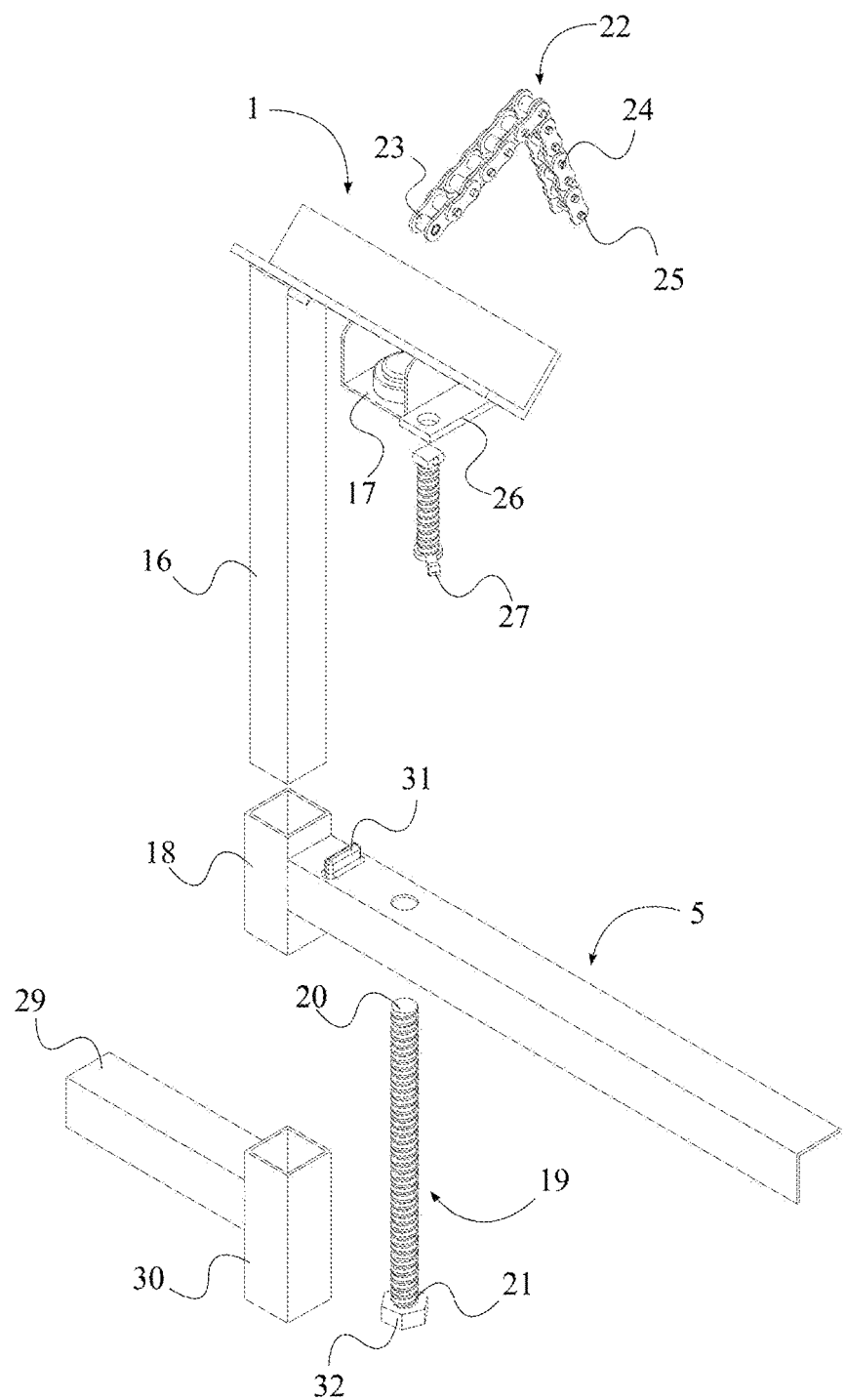
FIG. 4 is a perspective exploded view of the pipe guide and the guide shaft.

In order to do achieve the necessary functions, the present invention comprises a pipe guide 1, a guide shaft 5, and an adapter 6 as illustrated in FIGS. 1-7. The pipe guide 1 is used to hold the pipe or comparable fitting stationary. More specifically, the pipe guide 1 is used to orient the pipe in a position which is beneficial during the welding process. The pipe guide 1 is designed to be of a considerable length so that a large surface area is provided for the pipe to rest on. The guide shaft 5 is used to position and guide the adapter 6 along a length of the pipe which is resting on the pipe guide 1. In order to fulfill the functionality, the pipe guide 1 is height adjustably positioned and oriented in parallel to the guide shaft 5 as seen in FIG. 2. The adapter 6 is used to hold and align the fitting that is to be welded onto the pipe. The adapter 6 can vary according to the fitting that is to be welded. Moreover, the position in which the adapter 6 needs to be positioned in can also vary according to the welding. In order to address the issue, the adapter 6 is slidably positioned along the guide shaft 5. In the preferred embodiment of the present invention, the guide shaft 5 has an L-shaped cross section as seen in FIG. 3 and FIG. 4. Since the height between the guide shaft 5 and the pipe guide 1 can also be adjusted, a considerable number of operating positions are made available for the adapter 6 through the present invention.

The present invention further comprises a connecting arm 16, a bolt holder 17, a sleeve 18, and a height adjustment bolt 19 as seen in FIG. 2. The connecting arm 16, which is terminally and perpendicularly fixed to the pipe guide 1, is used to move the guide shaft 5 to different distances from the pipe guide 1. The sleeve 18, which is terminally and perpendicularly fixed to the guide shaft 5, is used in the process of positioning the guide shaft 5 at a desired distance from the pipe guide 1. In order to do so, the sleeve 18 is slidably engaged along the connecting arm 16 so that the guide shaft 5 can be moved to different positions along the connecting arm 16. The height adjustment bolt 19 and the bolt holder 17 are used to secure the position of the guide shaft 5 at an appropriate distance from the pipe guide 1. In order to do so, the bolt holder 17 is perpendicularly fixed to the pipe guide 1 and the height adjustment bolt 19 is engaged in between the guide shaft 5 and the bolt holder 17 in parallel to the sleeve 18. Moreover, the bolt holder 17 is separated from the connecting arm 16 and positioned along the pipe guide 1. Resultantly, a user can adjust the position of the guide shaft 5 by regulating the height adjustment bolt 19 so that the vertical positioning of the fitting can be set as preferred.

Figure 5:
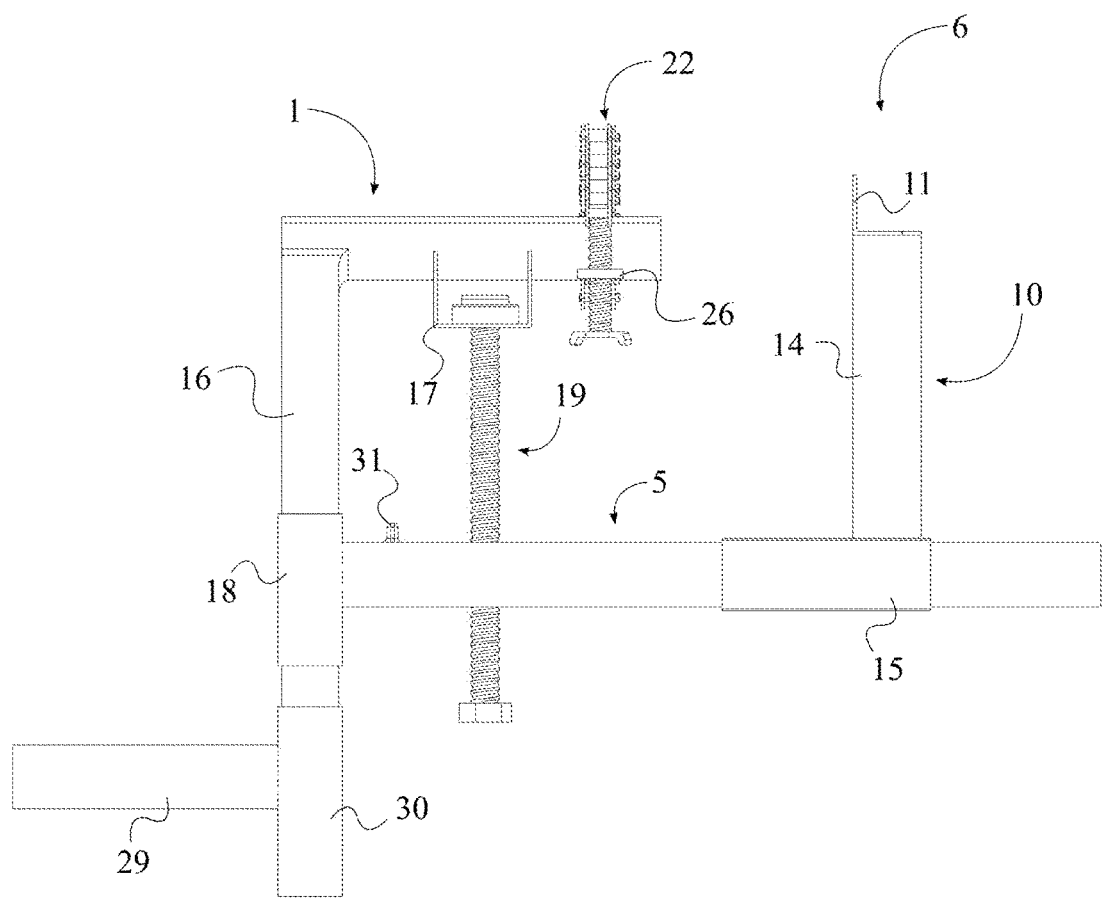
FIG. 5 is a side view of the present invention, wherein the adapter is a flange adapter.

In order to adjust the horizontal positioning of the adapter 6, the adapter 6 comprises a mount 10 and a base section 15 as illustrated in FIG. 5. The base section 15 is slidably engaged along the guide shaft 5. In order to correspond to the L-shape of the guide shaft 5, the base section 15 also has a L-shaped cross section in the preferred embodiment of the present invention. As a result, a fitting positioned on the mount 10, which is perpendicularly fixed to the base section 15, can also be repositioned as required to any position along the guide shaft 5.

Figure 18:
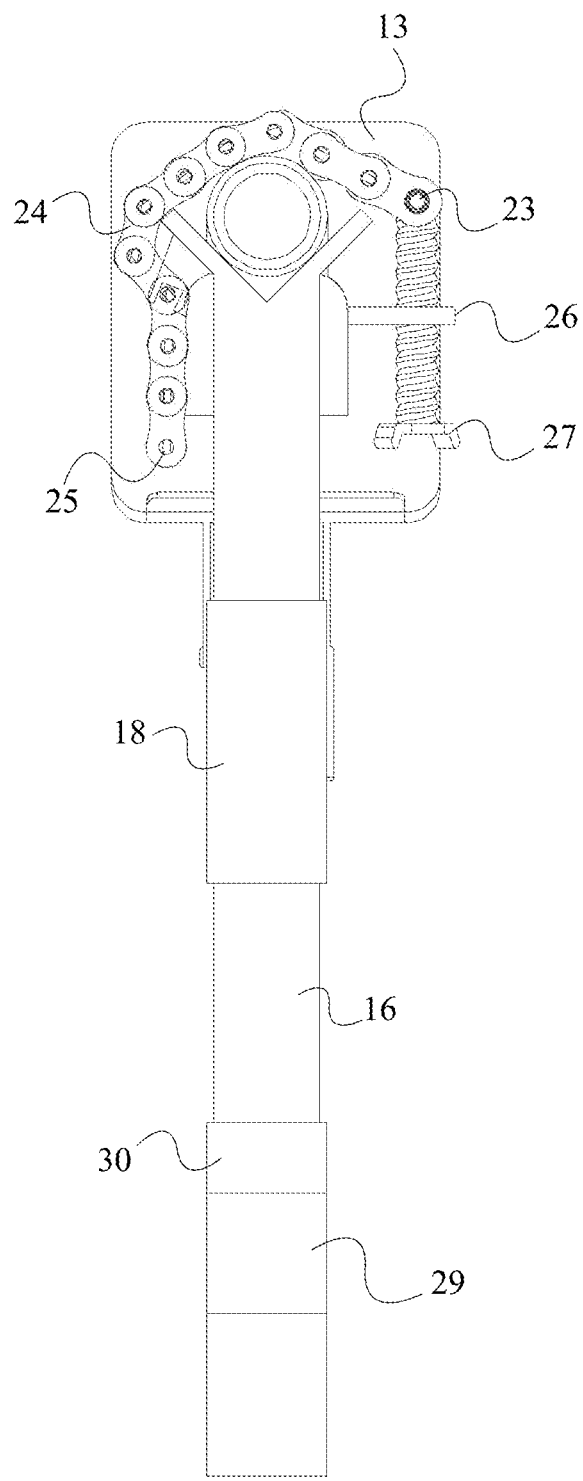
FIG. 18 is another side view of the 45-degree adapter being used.

In addition to having the fitting stationary, having the pipe stationary is also essential during the welding process. In order to address the issue, the present invention comprises a chain 22, a chain fastener 26, and a chain guide 28 as illustrated in FIG. 3 and FIG. 4. The chain 22 is used to fasten the pipe or comparable item against the pipe guide 1 during the welding process as shown in FIG. 18. The chain fastener 26 and the chain guide 28 are positioned appropriately so that the chain 22 can be effectively used to fasten the pipe. In the preferred embodiment of the present invention, the pipe guide 1 is V-shaped and comprises a first angular surface 2 and a second angular surface 3. In order to create the V-shape, the first angular surface 2 is positioned at an acute angle 4 to the second angular surface 3. The chain fastener 26 is fixed to the first angular surface 2 and the chain guide 28 is fixed to the second angular surface 3. Thus, the pipe positioned in between the first angular surface 2 and the second angular surface 3 can be conveniently fastened with the chain 22. In general, the chain fastener 26 and the chain guide 28 need to be positioned laterally opposite to each other across the pipe guide 1 so that the chain 22 can be positioned around the pipe and fastened accordingly. The chain 22 comprises a first end 23 and a second end 25. The first end 23 is fixed to the chain fastener 26. In the preferred embodiment of the present invention, the chain fastener 26 is a wing screw-and-nut 27. However, the chain fastener 26 can vary in different embodiments of the present invention. When the first end 23 is secured, a medial portion 24 of the chain 22, which is positioned in between the first end 23 and the second end 25, is positioned through the chain guide 28 so that the pipe which is resting on the pipe guide 1 is fastened against the pipe guide 1. The chain 22 being fastened around a pipe is illustrated in FIG. 18.

In addition to the pipe and the fitting being stationary, the tools holding the pipe and the fitting also need to be stable during welding. Usually, the tool holding the pipe is clamped and the welding process is executed. However, the lack of surface area of the tool can cause the tool to be unstable during the welding process. In order to address the issue, the present invention comprises a mounting arm 29 and a mounting sleeve 30 as seen in FIG. 4. The mounting arm 29 provides sufficient surface area for secure clamping. On the other hand, the mounting sleeve 30 is used to establish a connection with the connecting arm 16. In order to satisfy these functionalities, the mounting arm 29 is perpendicularly fixed to the mounting sleeve 30. Then, the mounting sleeve 30 is slidably engaged along the connecting arm 16 allowing the user to move the mounting sleeve 30 along the connecting arm 16. When considering the positioning, the mounting sleeve 30 is positioned adjacent the sleeve 18 and opposite the pipe guide 1. In other words, in the final configuration, the sleeve 18 is positioned in between the mounting sleeve 30 and the pipe guide 1. Moreover, the mounting arm 29 is positioned in a direction opposite to the guide shaft 5 so that clamping can be completed effectively.

Figure 8:
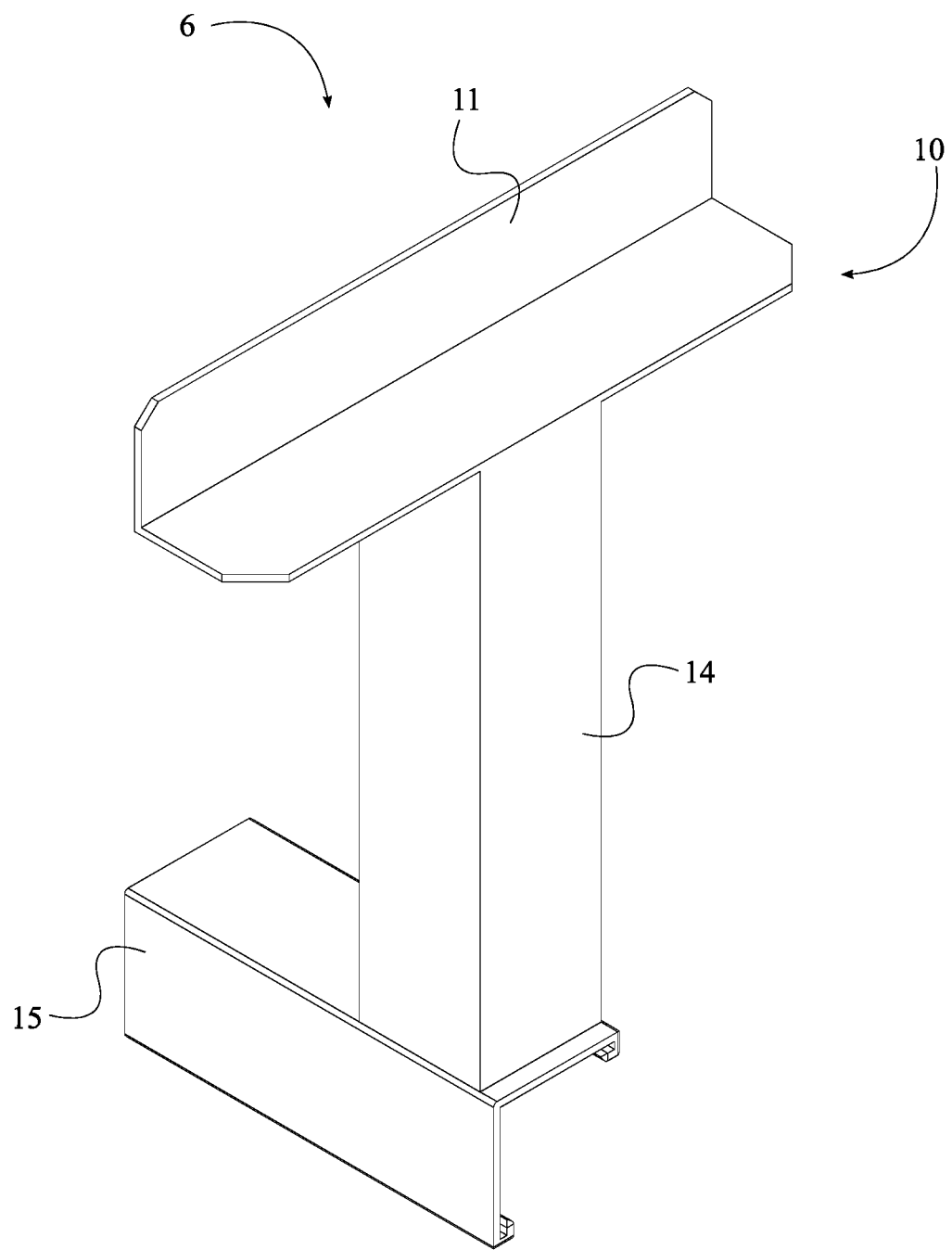
FIG. 8 is a perspective view of the flange adapter.
Figure 9:
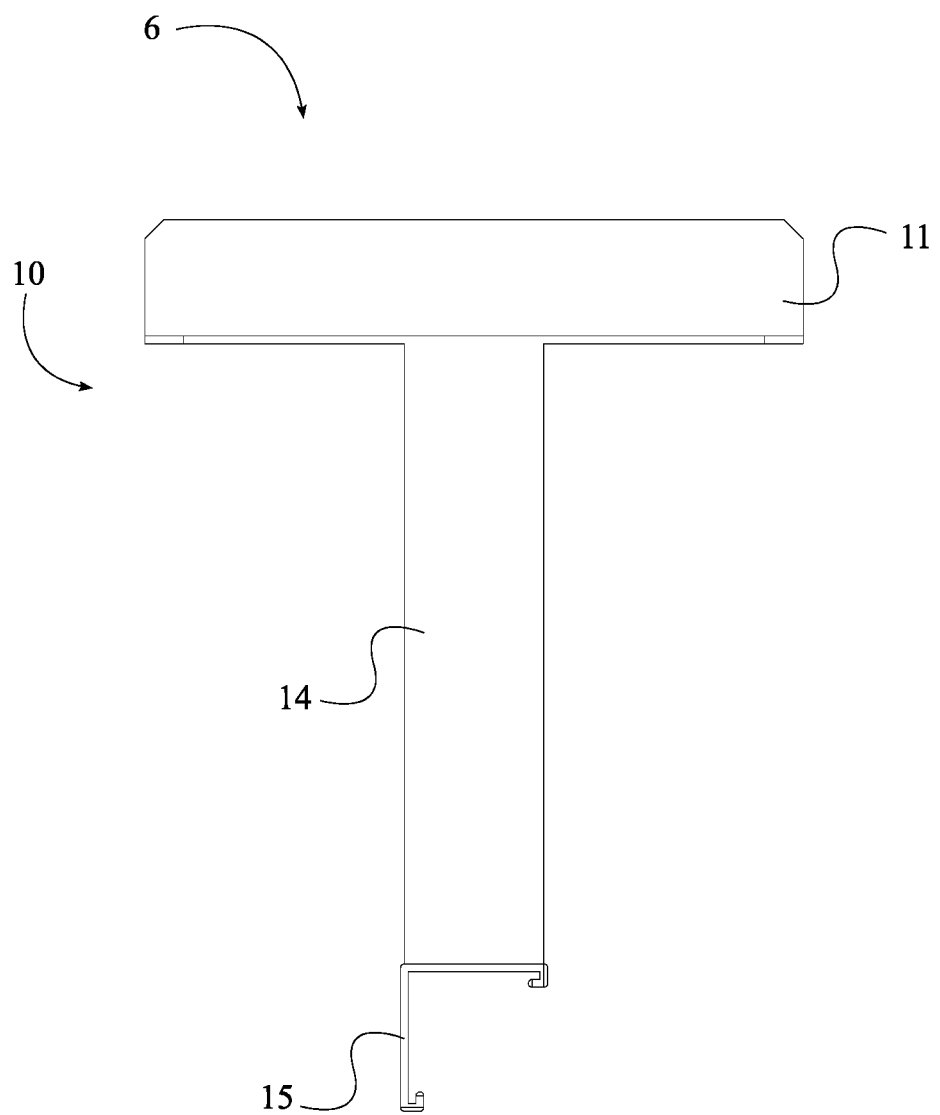
FIG. 9 is a side view of the flange adapter.
Figure 10:
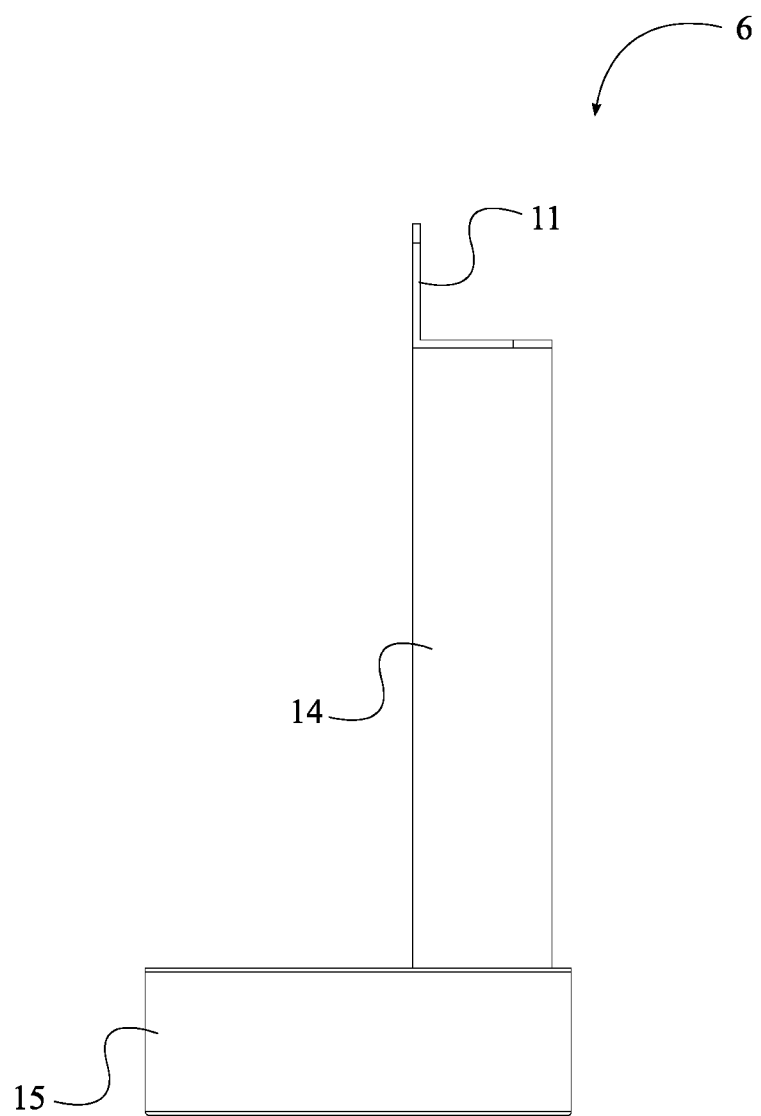
FIG. 10 is another side view of the flange adapter.

As mentioned before, the present invention can be used to weld fittings of different shapes and sizes. More specifically, the present invention can be used to weld flanges, 90-degree fittings, and 45-degree fittings. As an example, if the user intends on welding a flange fitting to the pipe resting on the pipe guide 1, a flange adapter which is shown in FIGS. 8-10, is used as the adapter 6. In this embodiment, the mount 10 comprises a L-shaped mount 11 and a mount body 14, wherein the L-shaped mount 11 is perpendicularly oriented to the base section 15. Moreover, the L-shaped mount 11 is terminally fixed to the mount body 14 opposite the base section 15 so that the flange fitting can be conveniently positioned adjacent to a pipe opening.

Figure 11:
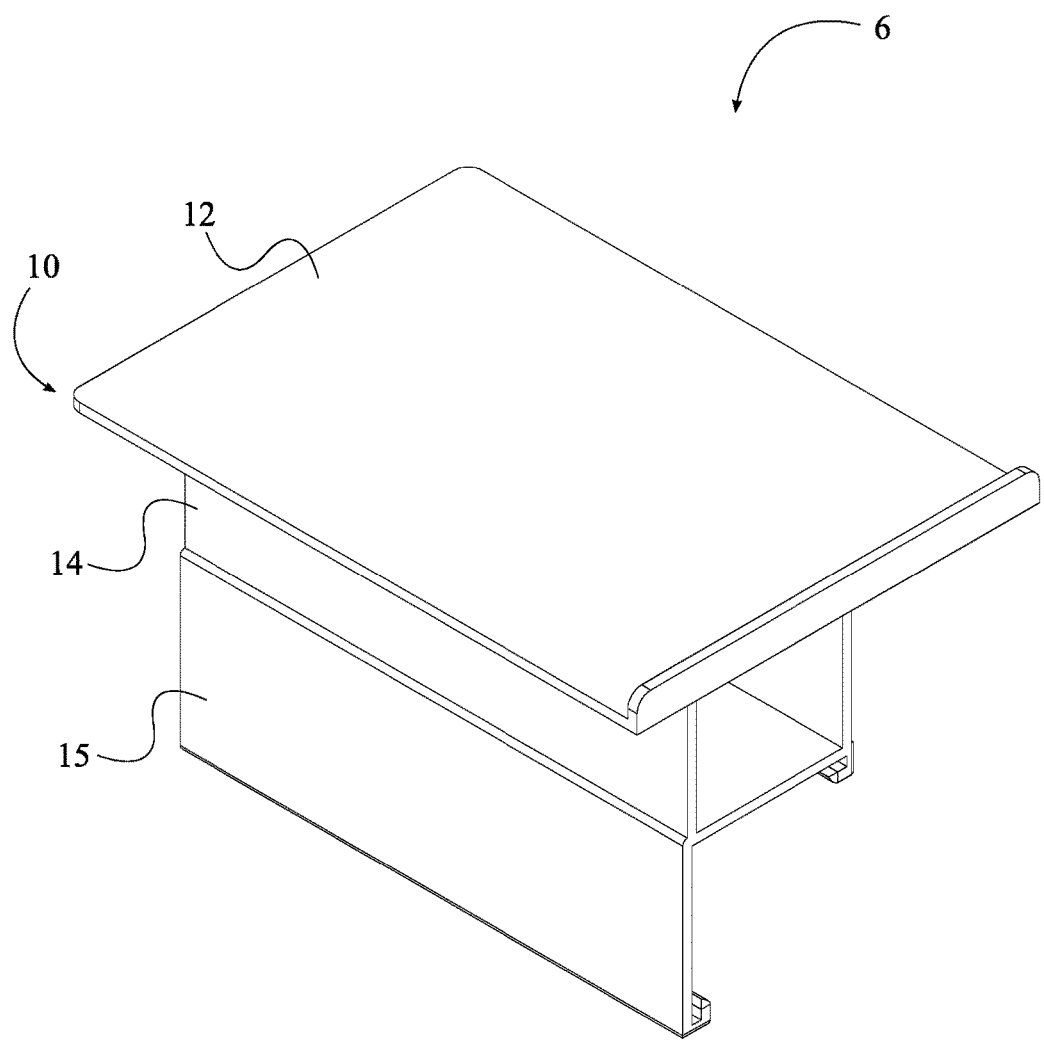
FIG. 11 is a perspective view of the 90-degree adapter.
Figure 12:
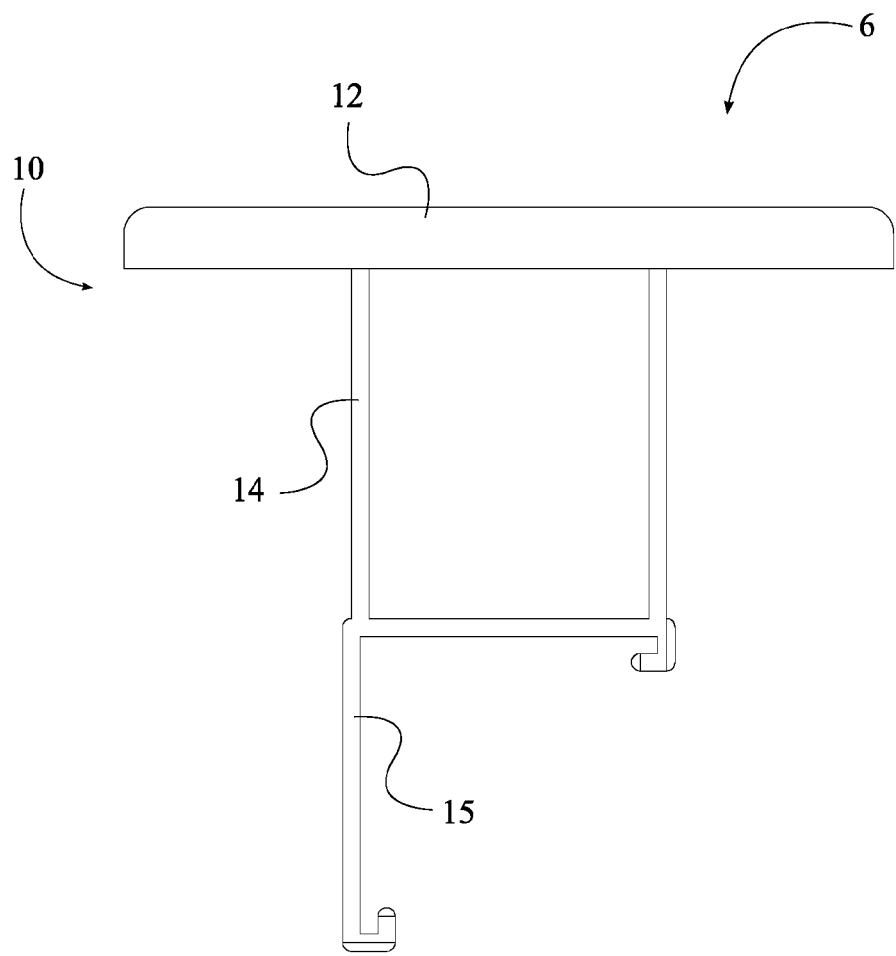
FIG. 12 is a side view of the 90-degree adapter.
Figure 13:
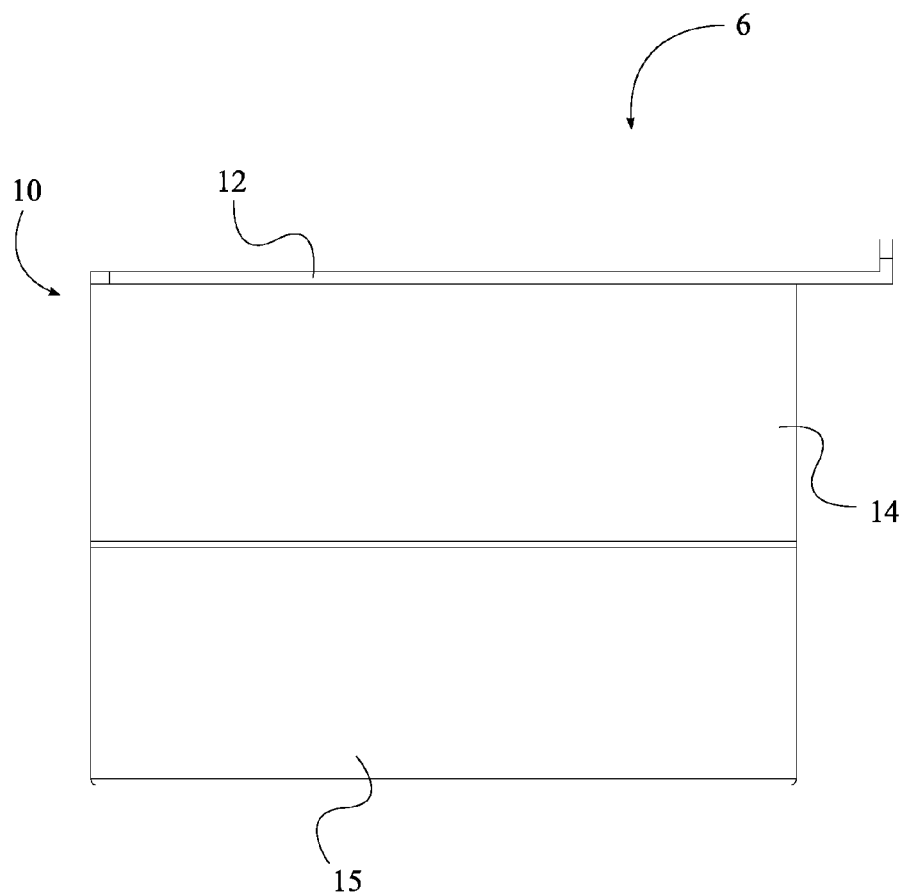
FIG. 13 is another side view of the 90-degree adapter.

As seen in FIGS. 11-13, if the user intends on welding a 90-degree fitting, a 90-degree adapter is used as the adapter 6. In this instance, the mount 10 comprises a planar receiving mount 12 and a mount body 14. The planar receiving mount 12, which is positioned in parallel to the base section 15, is terminally fixed to the mount body 14. Moreover, the base section 15 is terminally fixed to the mount body 14 opposite the planar receiving mount 12. When in use, the 90-degree fitting is positioned on the planar receiving mount 12. The mount body 14 enables the user to effectively position the 90-degree fitting adjacent the pipe opening.

Figure 14:
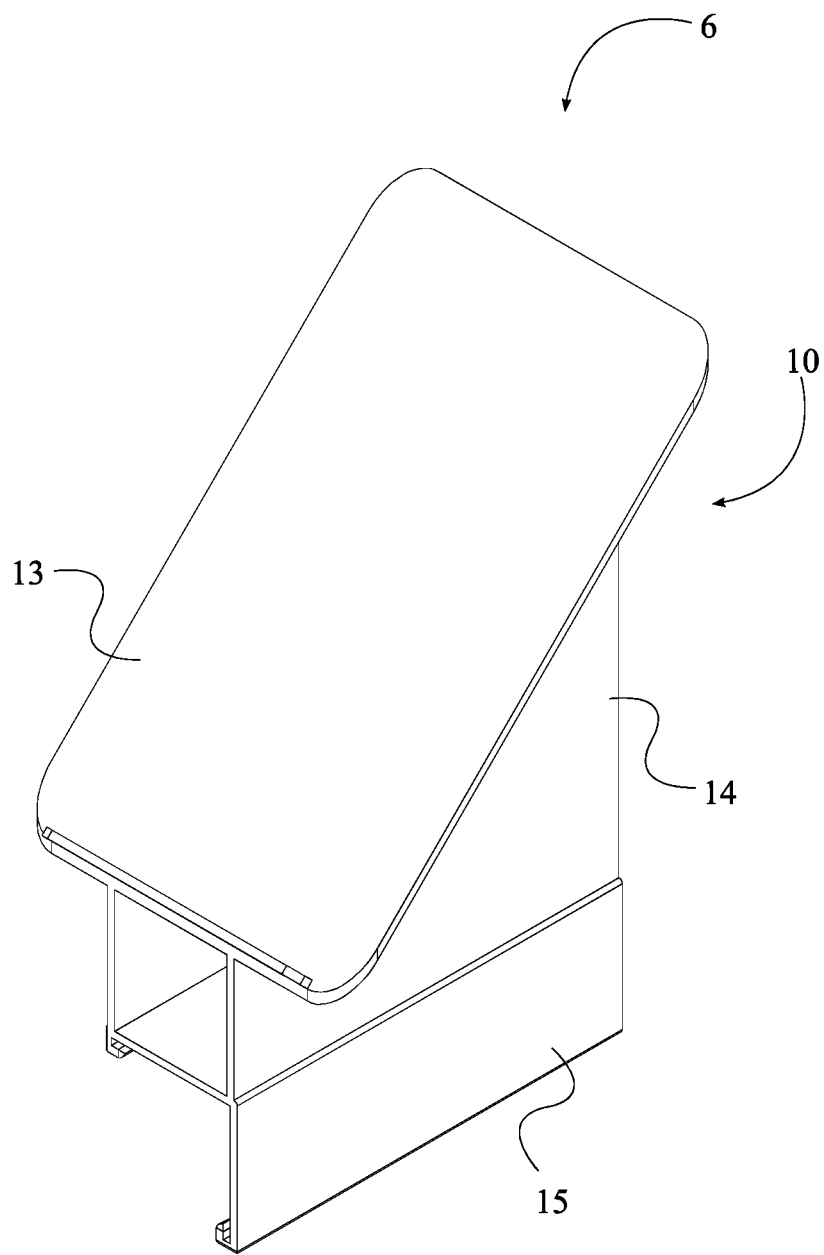
FIG. 14 is a perspective view of the 45-degree adapter.
Figure 15:
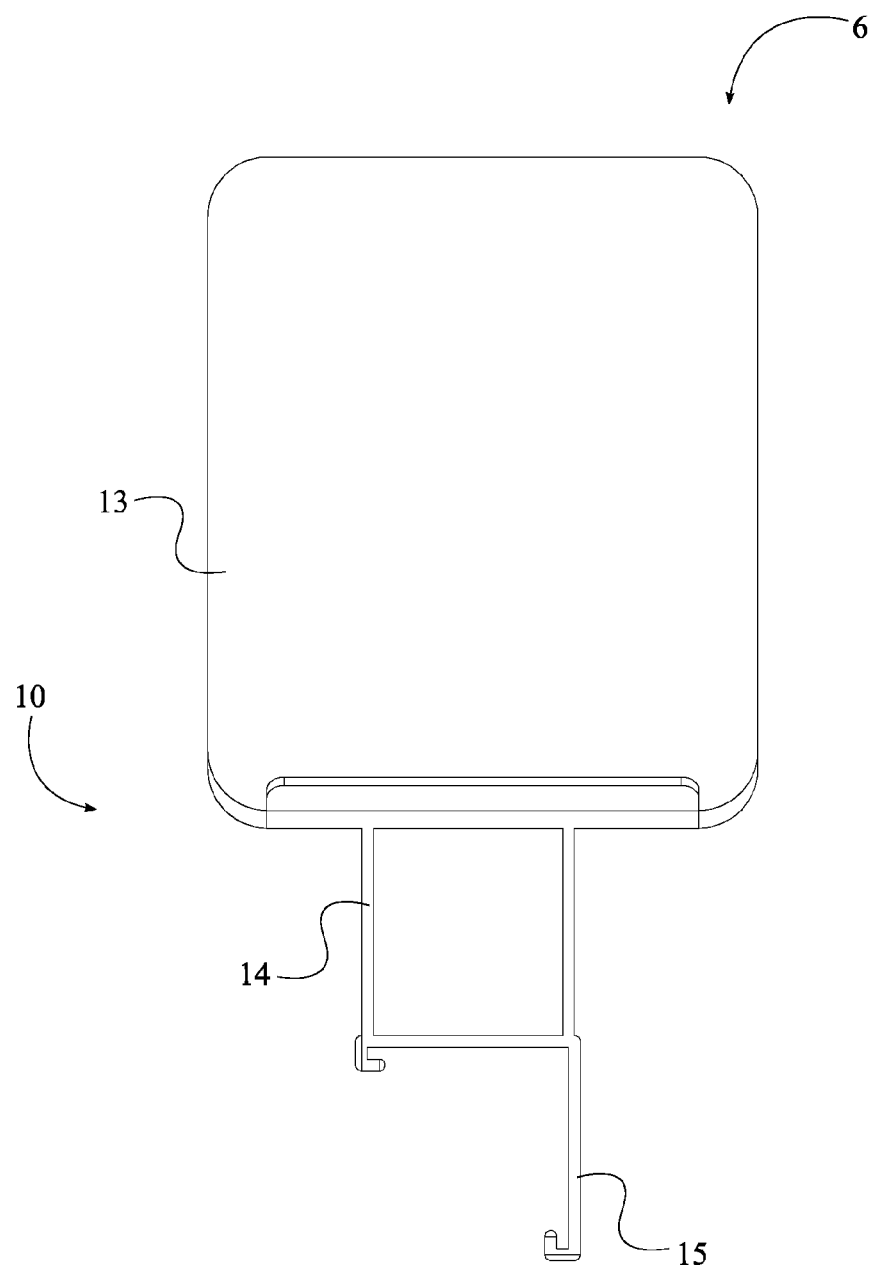
FIG. 15 is a side view of the 45-degree adapter.
Figure 16:
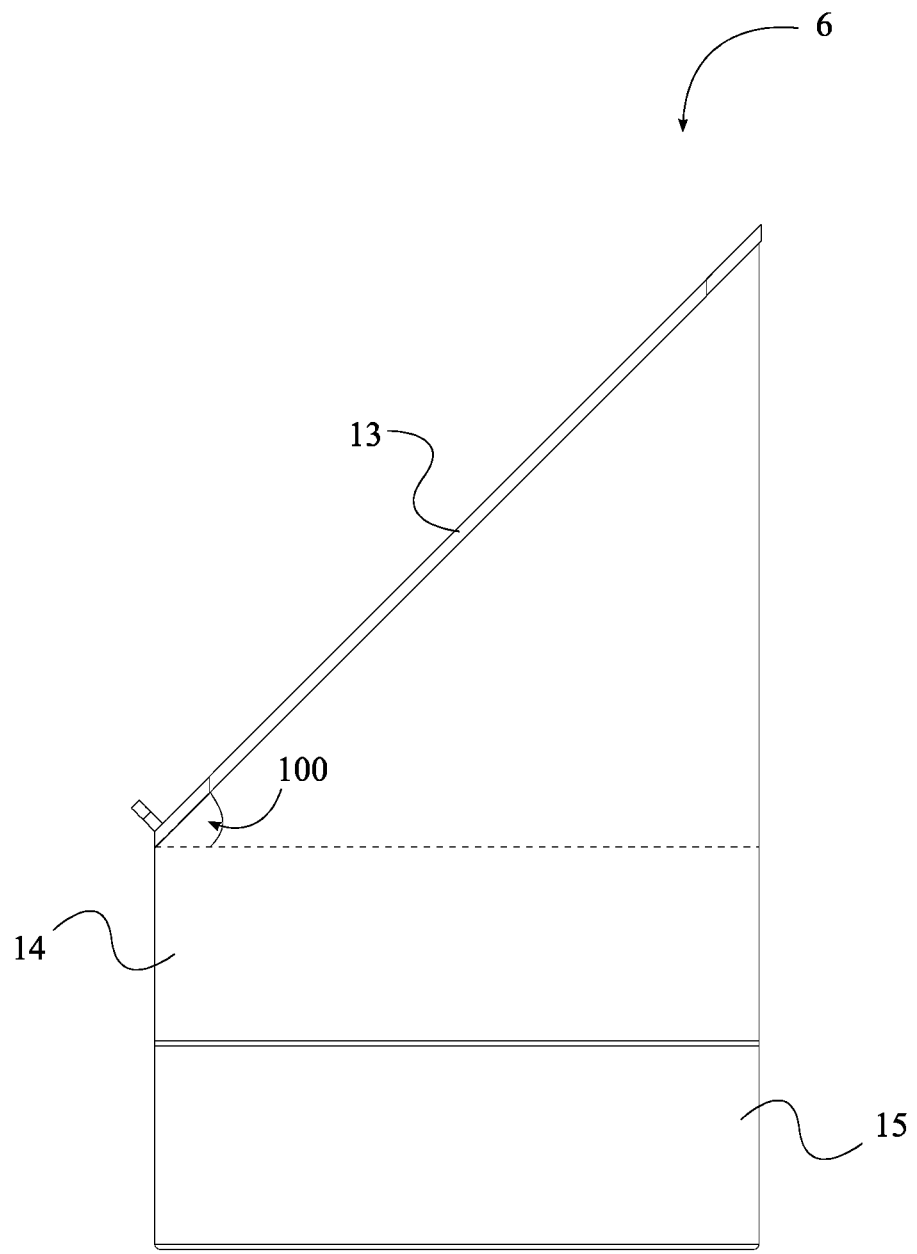
FIG. 16 is another side view of the 45-degree adapter.

In different circumstances, if a 45-degree fitting is to be welded, a 45-degree adapter is used as the adapter 6. In this embodiment, the mount 10 comprises an angular receiving mount 13 and a mount body 14. The angular receiving mount 13, which is terminally fixed to the mount body 14, is positioned at an acute angle 100 to the base section 15 so that the 45-degree fitting can be positioned appropriately. On the other hand, the base section 15 is terminally fixed to the mount body 14 opposite the angular receiving mount 13. As mentioned before, the mount body 14 is beneficial when repositioning the adapter 6 and also in the process of positioning the required fitting adjacent the pipe opening. The 45-degree adapter is illustrated in FIGS. 14-16.

Figure 17:
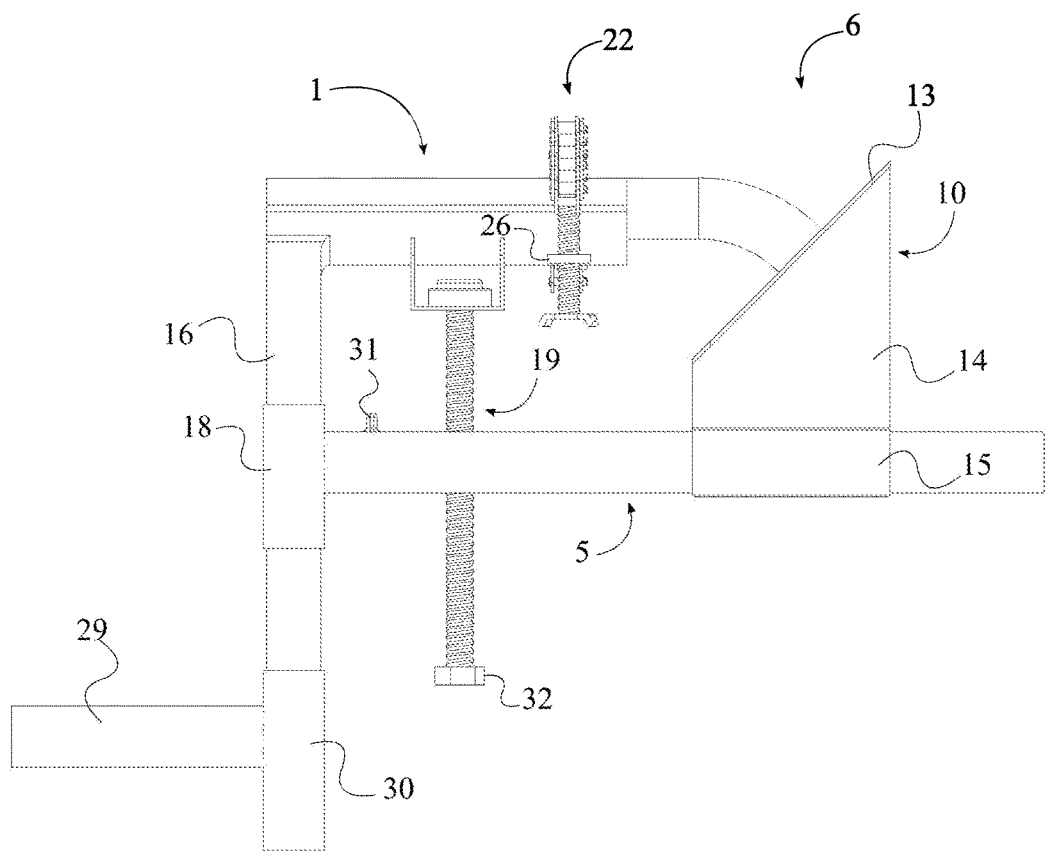
FIG. 17 is side view of the 45-degree adapter being used.

The present invention further comprises a levelling instrument 31 that can be beneficial during the welding process. In the preferred embodiment of the present invention, the levelling instrument 31 is integrated into the guide shaft 5 as seen in FIG. 17. The levelling instrument 31 can be used to ensure that the present invention maintains stability during the entire process of welding a fitting to a pipe.

Figure 6:
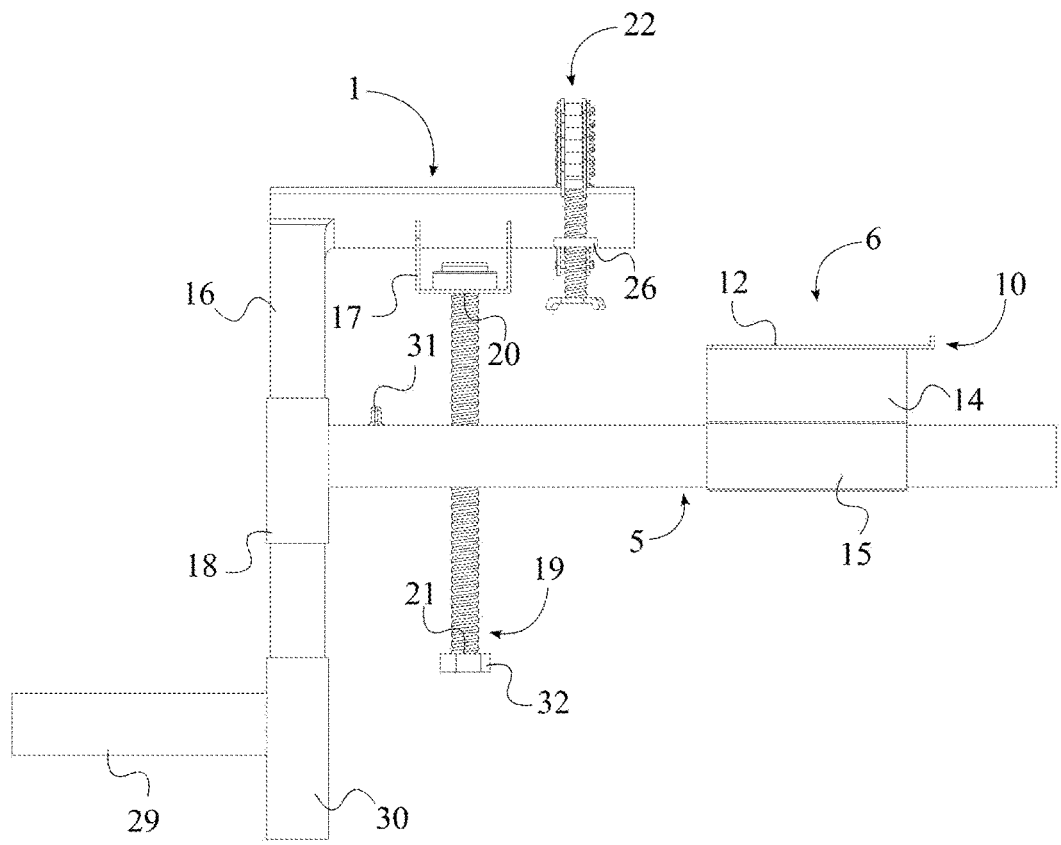
FIG. 6 is a side view of the present invention, wherein the adapter is a 90-degree adapter.
Figure 7:
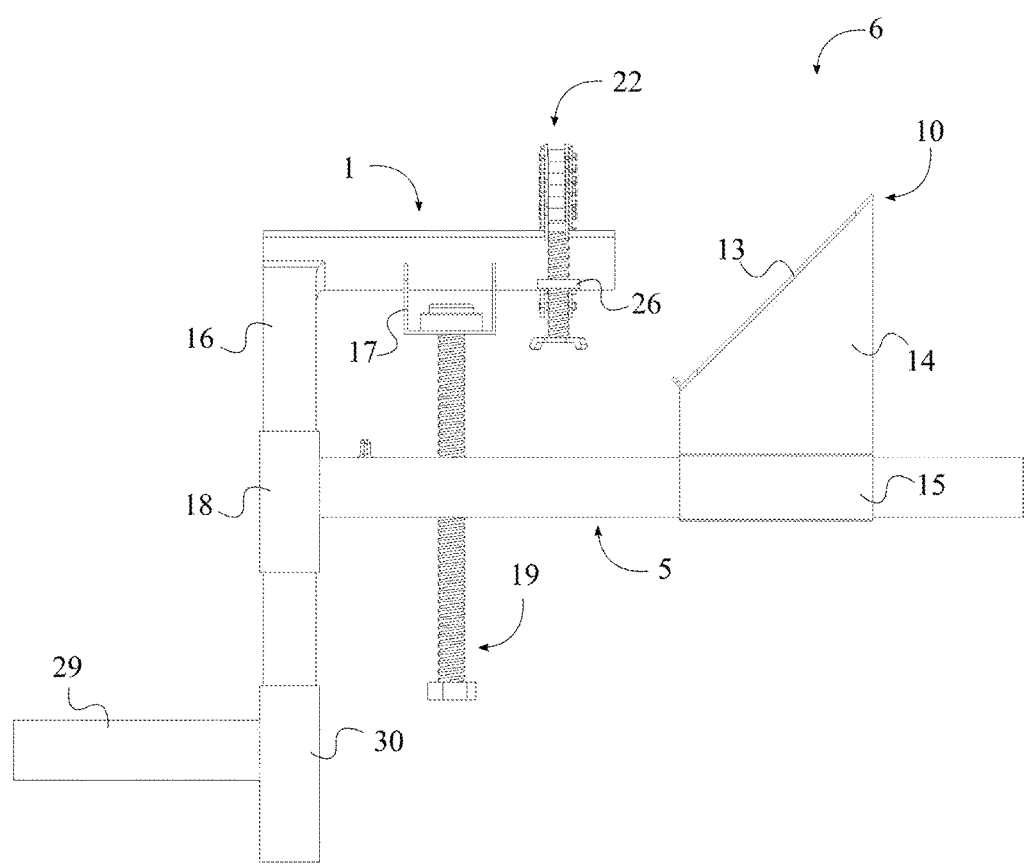
FIG. 7 is a side view of the present invention, wherein the adapter is a 45-degree adapter.

In order to provide user convenience, the present invention further comprises a gripping knob 32 as illustrated in FIG. 6. More specifically, the gripping knob 32 is used to provide a comfortable gripping surface to the user when controlling the height adjustment bolt 19. The height adjustment bolt 19 comprises a proximal end 20 and a distal end 21. The proximal end 20 traverses into the bolt holder 17. On the other hand, the gripping knob 32 is terminally fixed to the distal end 21. Therefore, by controlling the gripping knob 32 at the distal end 21, the user can move the guide shaft 5 upwards or downward as preferred. In order to aid in the process of controlling, the height adjustment bolt 19 is threaded from the proximal end 20 to the distal end 21.

When utilizing the present invention, the following process flow is generally followed. Initially, the connecting arm 16 is positioned within the sleeve 18. Next, the connecting arm 16 is also positioned within the mounting sleeve 30 such that the mounting sleeve 30 is positioned adjacent the first sleeve 18. In doing so, the mounting arm 29 is oriented in a direction opposite to the guide shaft 5 and the pipe guide 1. When the slidable components are appropriately positioned, the mounting arm 29 is secured. As an example, the mounting arm 29 can be clamped. Next, the pipe that needs a fitting to be welded on to is positioned on the pipe guide 1. When positioning is complete, the pipe is fastened against the pipe guide 1 with the use of the chain 22. The adapter 6 is then selected according to the need. We will consider the instance of using a 45-degree adapter as shown in FIG. 17 and FIG. 18. In this instance, the base section 15 of the 45-degree adapter is positioned along the guide shaft 5. Next, the fitting that needs to be welded is positioned on the angular receiving mount 13 and the adapter 6 is moved appropriately along the guide shaft 5 so that the adapter 6 is positioned adjacent the pipe opening. When completed, the height adjustment bolt 19 is regulated so that the fitting is positioned as required next to the pipe opening. In order to do so, the user grasps the gripping knob 32 and rotates the height adjustment bolt 19 in a clockwise or counter clockwise direction. When the fitting is positioned, the welding is completed as necessary.

Although the invention has been explained in relation to its preferred embodiment, it is to be understood that many other possible modifications and variations can be made without departing from the spirit and scope of the invention as hereinafter claimed.

What is claimed is:

1. An alignment tool used for holding a fitting in the process of welding comprises:
   a pipe guide;
   a guide shaft;
   an adapter;
   a connecting arm;
   a bolt holder;
   a sleeve;
   a height adjustment bolt;
   the adapter comprises a mount and a base section;
   the connecting arm being terminally and perpendicularly fixed to the pipe guide;
   the bolt holder being perpendicularly fixed to the pipe guide;
   the bolt holder being separated from the connecting arm and positioned along the pipe guide;
   the guide shaft being perpendicularly fixed to the sleeve;
   the sleeve being slidably engaged along the connecting arm;
   the pipe guide being oriented parallel to the guide shaft;
   the height adjustment bolt being engaged between the guide shaft and the bolt holder, parallel to the sleeve;
   the mount being perpendicularly fixed to the base section; and
   the base section being slidably engaged along the guide shaft.

2. The alignment tool used for holding a fitting in the process of welding as claimed in claim 1 further comprises:
   a chain;
   a chain fastener;
   a chain guide;
   the pipe guide comprises a first angular surface and a second angular surface;
   the chain fastener being fixed to the first angular surface;
   the chain guide being fixed to the second angular surface;
   the chain fastener and the chain guide being positioned laterally opposite to each other across the pipe guide; and
   the first angular surface being positioned at an acute angle to the second angular surface.

3. The alignment tool used for holding a fitting in the process of welding as claimed in claim 2 further comprises:
   the chain comprises a first end and a second end;
   a first end being fixed to the chain fastener; and
   a medial portion of the chain being positioned through the chain guide, wherein the medial portion is position is positioned in between the first end and the second end.

4. The alignment tool used for holding a fitting in the process of welding as claimed in claim 2, wherein the chain fastener is a wing screw-and-nut.

5. The alignment tool used for holding a fitting in the process of welding as claimed in claim 1 further comprises:
   a mounting arm;
   a mounting sleeve;
   the mounting arm being perpendicularly fixed to the mounting sleeve;
   the mounting sleeve being slidably engaged along the connecting arm;
   the mounting sleeve being positioned adjacent the sleeve and opposite the pipe guide; and
   the mounting arm being positioned opposite to the guide shaft.

6. The alignment tool used for holding a fitting in the process of welding as claimed in claim 1 further comprises:
   wherein the adapter is a flange adapter;
   the mount comprises a L-shaped mount and a mount body;
   the L-shaped mount being perpendicularly oriented to the base section; and
   the L-shaped mount being terminally fixed to the mount body opposite the base section.

7. The alignment tool used for holding a fitting in the process of welding as claimed in claim 1 further comprises:
   wherein the adapter is a 90-degree adapter;
   the mount comprises a planar receiving mount and a mount body;
   the planar receiving mount being positioned in parallel to the base section;
   the planar receiving mount being terminally fixed to the mount body; and
   the base section being terminally fixed to the mount body opposite the planar receiving mount.

8. The alignment tool used for holding a fitting in the process of welding as claimed in claim 1 further comprises:
   wherein the adapter is a 45-degree adapter;
   the mount comprises an angular receiving mount and a mount body;
   the angular receiving mount being positioned at an acute angle with the base section;
   the angular receiving mount being terminally fixed to the mount body; and
   the base section being terminally fixed to the mount body opposite the angular receiving mount.

9. The alignment tool used for holding a fitting in the process of welding as claimed in claim 8, wherein the height adjustment bolt is threaded from the proximal end to the distal end.

10. The alignment tool used for holding a fitting in the process of welding as claimed in claim 1 further comprises:
a leveling instrument; and
the levelling instrument being integrated into the guide shaft.

11. The alignment tool used for holding a fitting in the process of welding as claimed in claim 1 further comprises:
a gripping knob;
the height adjustment bolt comprises a proximal end and a distal end;
the proximal end traversing into the bolt holder; and
the gripping knob being terminally fixed to the distal end.

12. The alignment tool used for holding a fitting in the process of welding as claimed in claim 1, wherein a cross section of the guide shaft is L-shaped.

13. The alignment tool used for holding a fitting in the process of welding as claimed in claim 1, wherein a cross section of the base section is L-shaped.

* * * * *